(12) United States Patent
Murphy et al.

(10) Patent No.: US 11,157,066 B2
(45) Date of Patent: Oct. 26, 2021

(54) FLOORPLAN INDEPENDENT AND CROSS-CURRENT-FREE DISTRIBUTED POWER SWITCH

(71) Applicant: QUALCOMM Incorporated, San Diego, CA (US)

(72) Inventors: Byron Murphy, San Diego, CA (US); Rajeev Jain, Milpitas, CA (US); Lipeng Cao, La Jolla, CA (US); Harshat Pant, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 123 days.

(21) Appl. No.: 16/690,680

(22) Filed: Nov. 21, 2019

(65) Prior Publication Data

US 2020/0192461 A1   Jun. 18, 2020

Related U.S. Application Data

(60) Provisional application No. 62/778,943, filed on Dec. 13, 2018.

(51) Int. Cl.
*G06F 1/26* (2006.01)
*G06F 1/3287* (2019.01)
*G06F 1/3234* (2019.01)
*G06F 1/3293* (2019.01)

(52) U.S. Cl.
CPC ............ *G06F 1/3287* (2013.01); *G06F 1/263* (2013.01); *G06F 1/3243* (2013.01); *G06F 1/3293* (2013.01)

(58) Field of Classification Search
CPC ...... G06F 1/3287; G06F 1/263; G06F 1/3243; G06F 1/3293
See application file for complete search history.

(56) References Cited

U.S. PATENT DOCUMENTS

| | | | | |
|---|---|---|---|---|
| 5,886,424 | A | * | 3/1999 | Kim .................. G06F 1/263 307/64 |
| 6,157,221 | A | * | 12/2000 | Gorham ........... G01R 19/16504 327/65 |
| 2013/0328414 | A1 | * | 12/2013 | Sbuell .................. H03K 17/693 307/115 |
| 2014/0346878 | A1 | * | 11/2014 | Umeyama ............... H03K 3/012 307/52 |
| 2017/0185094 | A1 | * | 6/2017 | Atkinson ............... H02J 7/0063 |
| 2017/0185096 | A1 | * | 6/2017 | Rueger .................... G05F 3/262 |
| 2019/0155354 | A1 | * | 5/2019 | Au Yeung ............... G06F 1/263 |

* cited by examiner

*Primary Examiner* — Gary Collins
(74) *Attorney, Agent, or Firm* — Chui-kiu Teresa Wong

(57) ABSTRACT

A floorplan independent and cross-current free distributed adaptive power multiplexer (APM) is disclosed. In some implementations, an APM includes a first switch path coupled between a first voltage supply rail and an output terminal, the first switch path including a first switch; a second switch path coupled between a second voltage supply rail and the output terminal, the second switch path including a second switch, wherein the first switch and the second switch are configured to select one of a first voltage supply and a second voltage supply as an output voltage supply to be output at the voltage output terminal; and a comparator coupled to the first and the second voltage supply rails, and the voltage output terminal, wherein the comparator is configured to compare the output voltage supply with one of the first and the second voltage supplies and to output a control signal.

19 Claims, 4 Drawing Sheets

100 # FLOORPLAN INDEPENDENT AND CROSS-CURRENT-FREE DISTRIBUTED POWER SWITCH

CLAIM OF PRIORITY UNDER 35 U.S.C. § 119

The present Application for Patent claims priority to Provisional Application No. 62/778,943 entitled "A Floorplan Independent and Cross-current-free Distributed Power Switch" filed Dec. 13, 2018, and assigned to the assignee hereof and hereby expressly incorporated by reference herein.

FIELD OF DISCLOSURE

Aspects of the present disclosure relate generally to power management circuitry, and more particularly to floorplan independent distributed power switches with reduced cross-current.

BACKGROUND

A system on a chip (SOC) may include a plurality of modules or subsystems which perform various functions. For example, the SOC may include a general purpose processor, a signal processor, memories, etc. The SOC may also operate in a variety of SOC power modes to optimize power consumption. For example, the SOC power modes can include a low power mode in which one or more of the power domains is collapsed. When a power domain is collapsed, the voltage supply associated with the power domain is removed. In another example, the SOC power modes can include another low power mode in which a lower voltage supply is provided or selected upon entry. One module, an adaptive power multiplexer (APM), also referred to as a power switch, can be used to manage provision or selection of voltage supplies for other modules (e.g., memories) in various SOC power modes. For instance, a conventional APM can select a supply voltage out of a number of input supply voltages (e.g., 2 supply voltages) to output to a module, which is powered by the supply voltage output by the APM. Multiple APM's may be physically distributed across the SOC to manage voltage supplies to various modules or subsystems in the SOC to support different power modes. In some conventional design, there are hundreds of APM's distributed across a SOC. Thus, the APM's can be referred to as distributed APM's.

One common issue with conventional APM's is cross-current. Due to signal routing delays from one APM to another APM, there can be large currents from one supply to the other supply as the APM's switch from one voltage supply to another voltage supply. One common practice to minimize cross-current is to carefully place the APM's across the SOC. However, this places more burden on layout and the resultant SOC may require more silicon area. Another conventional approach is to impose stringent requirements on signal timing control and APM switching sequence (i.e., the sequence in which the APM's are turned on or off). However, this approach imposes extra burden on design because of the iterative adjustment required. Cross-current in the APM's can increase supply noise, causing the SOC to fail power delivery network (PDN) requirements.

In addition to the above issues, local variations and noise in supply voltages can cause voltages to be at different potentials at various places across the SOC. In this case, one APM may have reverse current while other APM's have none.

Accordingly, there is a need in the art for improved distributed APMs that are independent of placement on the SOC (i.e., floorplan independent) and have minimal cross-current.

SUMMARY OF THE DISCLOSURE

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In some implementations, an adaptive power multiplexer (APM) includes a first switch path coupled between a first voltage supply rail and an output terminal, the first switch path including a first switch; a second switch path coupled between a second voltage supply rail and the output terminal, the second switch path including a second switch, wherein the first switch and the second switch are configured to select one of a first voltage supply from the first voltage supply rail and a second voltage supply from the second voltage supply rail as an output voltage supply to be output at the voltage output terminal; and a comparator coupled to the first voltage supply rail, the second voltage supply rail, and the voltage output terminal, wherein the comparator is configured to compare the output voltage supply with one of the first voltage supply and the second voltage supply and to output a control signal.

In some implementations, the first switch path further comprises a first diode coupled between the first switch and the voltage output terminal; and the second switch path further comprises a second diode coupled between the second switch and the voltage output terminal.

In some implementations, an output of the comparator is coupled to the first diode and the second diode such that one of the first diode and the second diode is activated in response to the control signal from the comparator.

In some implementations, the first diode is configured to block cross-current flowing from the voltage output terminal to the first voltage supply rail when the first diode is activated. Furthermore, the second diode is configured to block cross-current flowing from the voltage output terminal to the second voltage supply rail when the second diode is activated In some implementations, the first diode is a first diode-connected FET and the second diode is a second diode-connected FET.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

According to one aspect of the disclosure, a compact low power comparator is included in each APM within a SOC to compare an output voltage of the APM (vdd_apm) with one of the input voltages to the APM. In some implementations, there are two input voltages to the APM, namely, vdd_aux and vdd_dom, from two different voltage rails in the SOC. The APM is operable to select one of the input voltages to pass as the output of the APM. By having the local compact low power comparator within the APM, local variations and noise in supply voltages can be more accurately accounted for.

According to another aspect of the disclosure, a diode is added into each voltage switch branch coupling between one of the input voltages and the output voltage of the APM. Based on the result from the local compact low power comparator, the APM can select a diode in one of the voltage switch branches connected to the input voltage rails to activate. By activating the diode in the voltage switch branch selected, the diode blocks current flowing from the output of the APM to the respective input voltage rail connected to the other end of the voltage switch branch. Thus, cross-current caused by local transients and/or a temporary difference in voltage potentials between the APMs as the APMs are switching can be prevented or minimized.

According to a further aspect of the disclosure, the built-in capability to prevent or minimize cross-current of the APMs makes the APMs floorplan independent. This is because the APM with the local comparator and diodes can block or minimize cross-current. Unlike conventional APMs, which rely, in part, on careful placement across the SOC to reduce or avoid cross-current.

More details of some implementations of the distributive APM are described below. One should appreciate that the detailed implementations are provided for the purpose of illustrating the concepts disclosed and the advantages achieved. The concepts disclosed are not limited to the exemplary implementations disclosed herein.

Figure 1:
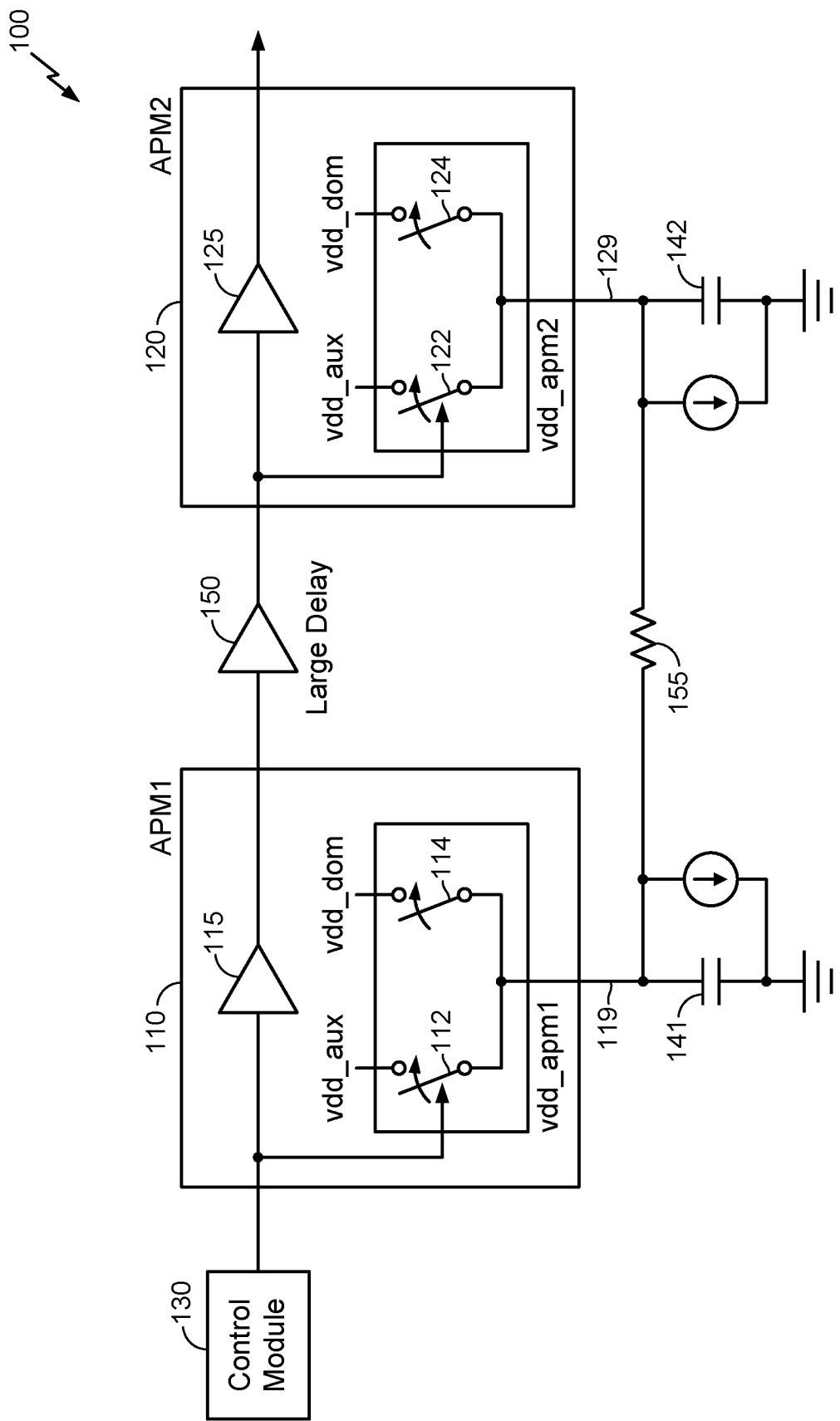
FIG. 1 is a system on a chip (SOC) having conventional adaptive power multiplexers (APM's).

FIG. 1 is a system on a chip (SOC) 100 having conventional adaptive power multiplexers (APM's) 110 and 120. More specifically, SOC 100 includes two APM's 110 and 120, a control module 130, and two loads 141 and 142. APM 110 is coupled to control module 130 to receive control signals from control module 130. Through APM 110 and other circuitries in SOC 100, which is represented by delay 150 in FIG. 1, the control signals from control module 130 are passed onto APM 120. The control signals can be further passed onto other APM(s) on SOC 100 from APM 120. The delay of the control signals attributed to internal circuitries within each of APMs 110 and 120 is represented by buffers 115 and 125, respectively. APM 110 has a voltage output 119, which is coupled to load 141, to provide an output voltage vdd_apm1 to load 141. Likewise, APM 120 has a voltage output 129, which is coupled to load 142, to provide an output voltage vdd_apm2 to load 142. APM 110 further includes two switches 112 and 114 coupled between output 119 and voltage supplies, vdd_aux and vdd_dom, respectively. Each of the circuit path connecting one of the voltage supplies to output 119 can also be referred to as a switch path. Switches 112 and 114 can be opened or closed in response to the control signals from control module 130 in order to select one of the voltage supplies (vdd_aux or vdd_dom) to be the output voltage vdd_apm1. Likewise, APM 120 further includes two switches 122 and 124 to couple to voltage sources, vdd_aux and vdd_dom, respectively. Switches 122 and 124 can be opened or closed in response to the control signals from control module 130 via APM 110. Each of loads 141 and 142 includes a capacitor and a current sink, coupled to each other in parallel, to represent circuitries and/or modules that receive their voltage supplies from APMs 110 and 120. Loads 141 and 142 can be coupled to each other via other circuitries in SOC 100, which is represented by the resistor 155.

In some implementations, SOC 100 can support multiple power modes (e.g., normal mode, low power mode, sleep mode, etc.). Control module 130 can generate the appropriate control signals for voltage supply selection based on the current power mode of SOC 100. In response to the control signals from control module 130, APMs 110 and 120 can select one of the voltage supplies, vdd_aux and vdd_dom, and outputs the voltage supply selected as vdd_apm1 and vdd_apm2, respectively, to loads 141 and 142. Specifically, switch 112 can be opened and switch 114 can be closed in response to the control signals to select vdd_dom to be output as vdd_apm1. Alternatively, switch 112 can be closed and switch 114 can be opened in response to the control signals to select vdd_aux to be output as vdd_apm1. Likewise, switch 122 can be opened and switch 124 can be closed in response to the control signals to select vdd_dom to be output as vdd_apm2. Alternatively, switch 122 can be closed and switch 124 can be opened in response to the control signals to select vdd_aux to be output as vdd_apm2.

One issue with APMs 110 and 120 is cross-current. Because APMs 110 and 120 are sequentially switched to select their respective voltage supply, it is possible to generate a cross-current flowing from one APM to another APM unintentionally. For example, suppose vdd_dom is higher than vdd_aux, and both APMs 110 and 120 are configured to select vdd_dom (i.e., switches 114 and 124 are closed, and switches 112 and 122 are open). When APM 110 switches to close switch 112 to select vdd_aux and open switch 114 to de-select vdd_dom in response to the control signals from control module 130, the control signals may not have propagated to APM 120 yet due to the large delay (represented by buffer 150) across SOC 100. Thus, within APM 120, switch 122 is still open and switch 124 is still closed to select vdd_dom as the output voltage vdd_apm2 at output 129 of APM 120. Since the output voltage vdd_apm1 of APM 110 is now set at vdd_aux, which is lower than vdd_dom, vdd_apm1 is at a lower potential than vdd_apm2. Therefore, a cross-current can flow from the output 129 of APM 120 to the output 119 of APM 110, and further through the switch 112 to the voltage supply vdd_aux. Such cross-current creates undesirable supply noise and can lead to failure of power distribution network (PDN) requirements. On a system level, such supply noise can cause modules within SOC 100 to fail. For instance, memories within SOC 100 may fail to retain data due to the supply noise. Therefore, some improved APMs to minimize or reduce cross-current is incorporated into SOC 200 shown in FIG. 2.

Figure 2:
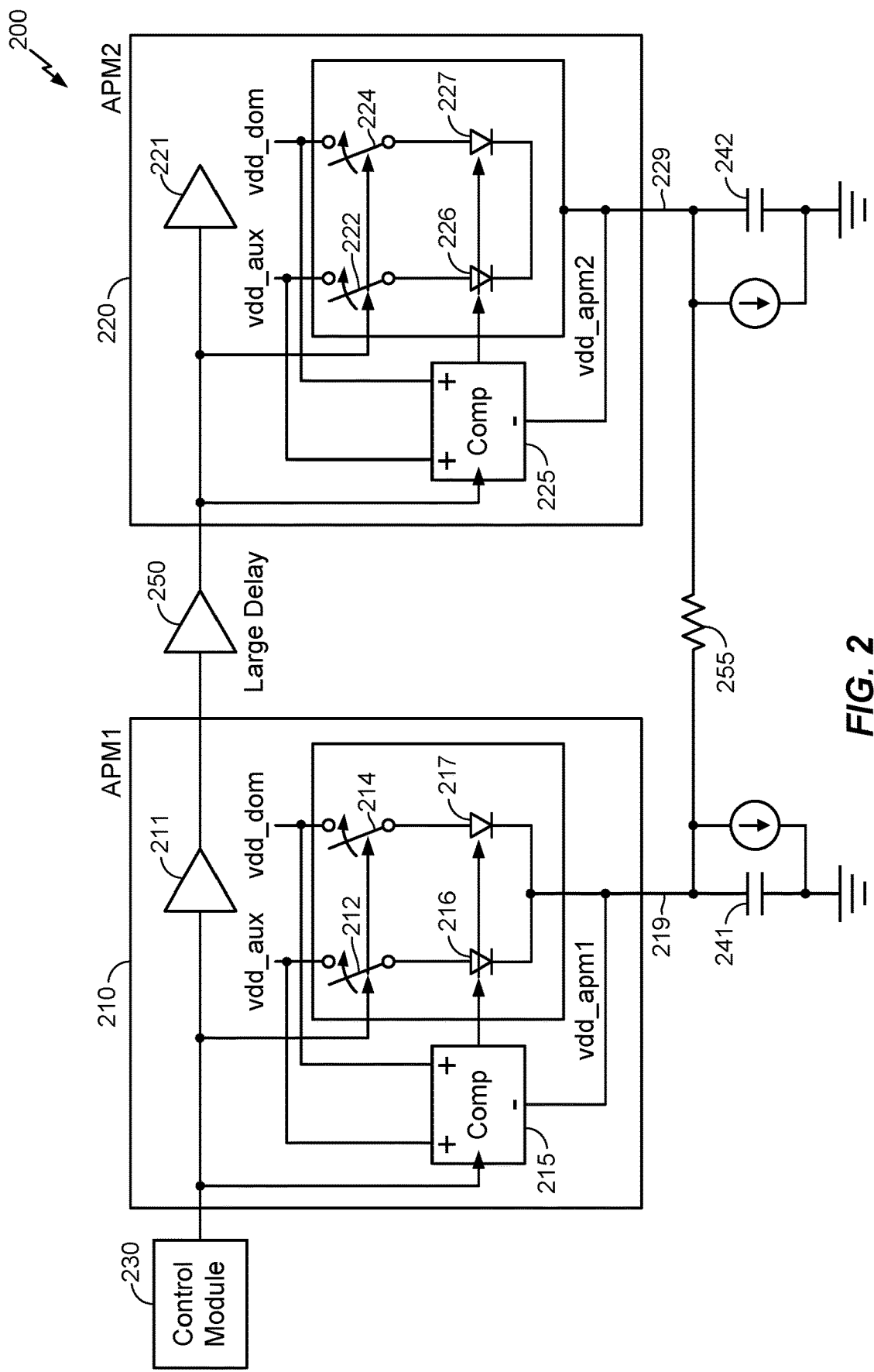
FIG. 2 is one implementation of a SOC having APM's according to some aspects of the invention.

FIG. 2 is one implementation of a SOC 200 having APM's 210 and 220 according to some aspects of the invention. Similar to SOC 100, SOC 200 includes two APM's 210 and 220, a control module 230, and two loads 241 and 242. Control module 230 is coupled to APM 210, through which control module 230 is further coupled to APM 220. Control module 230 provides control signals to APMs 210 and 220. The delay on the transmission of the control signals from APM 210 to APM 220 is represented by buffer 250; whereas the delay attributed to circuitries internal to APM 210 and APM 220 is represented by buffers 211 and 221, respectively. APMs 210 and 220 are structurally similar to each other.

In some implementations, AMP 210 includes a first and a second switch paths. A switch path as used herein generally refers to a circuit path connecting two nodes in a circuit, the circuit path having at least one switch. It should be appreciated that there can be one or more additional circuit elements/components (e.g., diodes, resistors, capacitors, inductors, transistors, etc.) along the circuit path. The first switch path connects voltage supply vdd_aux to the output 219 of APM 210. Specifically, the first switch path has switch 212, which is coupled to a voltage supply rail providing vdd_aux. Likewise, the second circuit path connects voltage supply vdd_dom to the output 219 of APM 210. The second switch path has switch 214, which is coupled to a voltage supply rail providing vdd_dom. In addition, APM 210 includes diodes 216 and 217 coupled between the output 219 of APM 210 and switches 212 and 214, respectively, along the first and the second switch paths. In the implementation illustrated in FIG. 2, diode 216 includes a positive terminal and a negative terminal. The positive terminal of diode 216 is directly coupled to switch 212, whereas the negative terminal of diode 216 is directly coupled to the output 219. Likewise, diode 217 includes a positive terminal and a negative terminal. The positive terminal of diode 217 is directly coupled to switch 214, whereas the negative terminal of diode 217 is directly coupled to the output 219. Furthermore, APM 210 includes a comparator 215, which receives one or more control signals from control module 230. Comparator 215 is also referred to as a local comparator of APM 210 because comparator 215 is implemented within APM 210. Based on the one or more control signals, comparator 215 compares the output voltage of APM 210, i.e., vdd_apm1, with one of vdd_aux and vdd_dom. Comparator 215 outputs a signal based on the comparison of vdd_apm1 and one of vdd_aux and vdd_dom to activate, enable, or turn on one of diodes 216 and 217. In some implementations, diodes 216 and 217 can be diode-connected field effect transistors (FETs). By activating diode 216 or diode 217 based on the result of comparison of vdd_apm1 and one of the supply voltages, the activated diode can block cross-current that might otherwise flow to one of the voltage supply rails of vdd_aux or vdd_dom. Hence, local transients on vdd_aux, vdd_dom, and/or vdd_apm1 can no longer cause large cross-current through APM 210. Thus, the local comparator 215 within APM 210 helps to protect the voltage supply rails of vdd_dom and vdd_aux. In some implementations, comparator 215 is a small, low voltage, low power comparator. Thus, the adverse impact on silicon area and power by having comparator 215 within APM 210 can be limited. Furthermore, comparator 215 can be turned on only just before and just after a switch occurs within APM 210 to further reduce its power consumption. In sum, local comparator 215 and diodes 216 and 217 operate together to provide a built-in mechanism for APM 210 to prevent or minimize cross-current.

To further illustrate the built-in cross-current prevention of APMs 210 and 220, consider the example discussed above with reference to APM 110 in FIG. 1, where vdd_dom is higher than vdd_aux. Suppose both APMs 210 and 220 are configured to select vdd_dom (i.e., switches 214 and 224 are closed, and switches 212 and 222 are open). When APM 210 switches to close switch 212 to select vdd_aux and open switch 214 to de-select vdd_dom in response to the control signals from control module 230, the control signals may not have propagated to APM 220 yet due to the large delay (represented by buffer 250) across SOC 200. Thus, within APM 220, switch 222 is still open and switch 224 is still closed to select vdd_dom as the output voltage vdd_apm2 at output 229 of APM 220. Since the output voltage vdd_apm1 of APM 210 is now set at vdd_aux, which is lower than vdd_dom, vdd_apm1 is at a lower potential than vdd_apm2. Therefore, a cross-current may flow from the output 229 of APM 120 to the output 219 of APM 210. Even with the voltage drop across resistor 255, the voltage at the output 219 of APM 210 (i.e., vdd_apm1) is higher than vdd_aux. To prevent the cross-current flowing from output 219 of APM 210 through the switch 212 to the voltage supply vdd_aux, diode 216 is activated, enabled, or turned on to block any cross-current that would have otherwise flowed through switch 212 to the supply rail of vdd_aux. In some implementations, local comparator 215 is configured to compare vdd_apm1 with vdd_aux in response to the control signals from control module 230. In some implementations, comparator 215 is turned on to compare vdd_apm1 with vdd_aux shortly before APM 210 switches from vdd_dom to vdd_aux, and then comparator 215 may be turned off shortly after APM 210 has switched from vdd_dom to vdd_aux. If comparator 215 determines vdd_aux is lower than vdd_apm1, then comparator 215 sends one or more control signals to diode 216 to activate, enable, or turn on diode 216.

To further illustrate the operation of APMs 210 and 220 and the mechanism incorporated therein to minimize cross-current, suppose APMs 210 and 220 switch from vdd_aux back to vdd_dom in response to the control signals from control module 230. Again, the control signals propagate to APM 210 first and then to APM 220 after the large delay represented by buffer 250. In response to the control signals, switch 214 is closed to select vdd_dom and switch 212 is opened to de-select vdd_aux. Thus, vdd_apm1 at the output 219 of APM 210 becomes vdd_dom. However, due to the large delay, switch 222 in APM 220 is still closed, and thus, vdd_apm2 is still at vdd_aux. Because vdd_apm1 is at a higher voltage than vdd_apm2, a cross-current can flow through resistor 255 to APM 220. To prevent the cross-current from flowing through switch 222 to the power rail of vdd_aux, diode 226 is activated, enabled, or turned on to block the cross-current. Specifically, local comparator 225 compares vdd_apm2 with vdd_aux and determines that vdd_apm2 is higher than vdd_aux. As a result, comparator 225 sends control signals to diode 226 to activate, enable, or turn on diode 226 to block the cross-current.

In addition to improving the robustness of APMs 210 and 220, the built-in mechanism to prevent cross-current eliminates the dependence on the floorplan of SOC 200. In other words, the functionality and performance of APMs 210 and 220 do not depend on the physical layout locations of APMs 210 and 220 within SOC 200. Because conventional APMs (e.g., APMs 110 and 120 in FIG. 1) lack the built-in capability or mechanism to prevent or minimize cross-current, conventional APMs are typically carefully placed in the floorplan or layout of the chip to reduce the risk of cross-current during switching. This limitation on floorplan imposes more burden on layout and often leads to inefficient use of silicon area.

Figure 3:
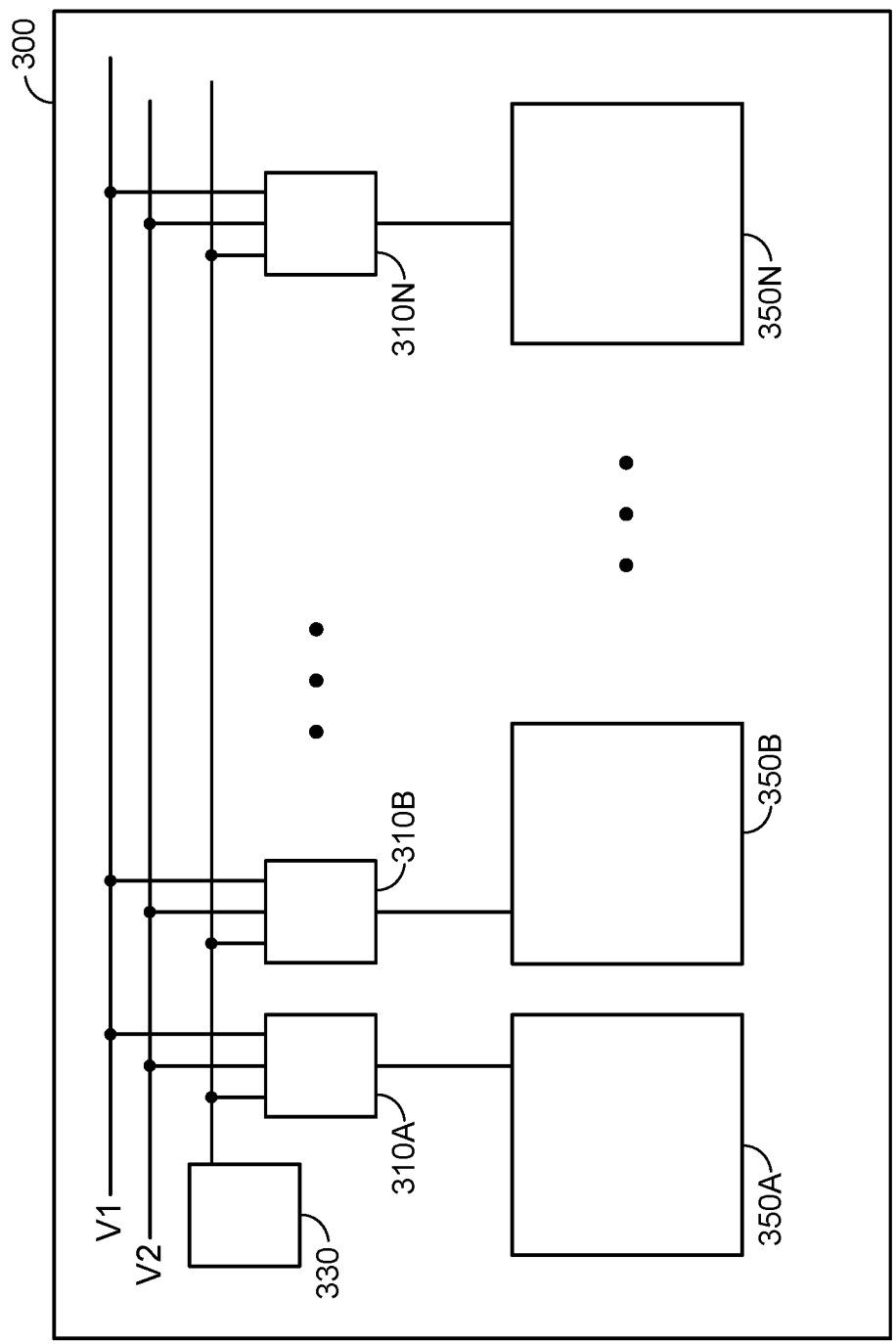
FIG. 3 shows one implementation of a system on a chip (SOC) 300.

FIG. 3 shows one implementation of a system on a chip (SOC) 300. SOC 300 includes a collection of circuit modules 350A-350N, which are fabricated on the same silicon substrate and are configured to operate with each other to form a system. Some examples of the modules 350A-350N include processors, memories, clock, etc. Some of the modules 350A-350N can operate at different supply voltages in different modes. Thus, the SOC 300 includes a plurality of APMs 310A-310N to select and provide the appropriate supply voltages to the modules 350A-350N. One implementation of APMs 310A-310N is shown in FIG. 2 and discussed in detail above. Referring to FIG. 3, APMs 310A-310N are coupled to a control module 330, which provide control signals to APMs 310A-310B to control voltage switching. APMs 310A-310N are also coupled to two voltage supply rails V1 and V2. Each of APMs 310A-310N can switch between the two voltage supply rails V1 and V2 in order to select the appropriate voltage for the respective module (one of modules 350A-350N).

In some implementations, APMs 310A-310N are daisy-chained and are configured to switch voltage sequentially. As discussed above, during voltage switching, transient cross-current may flow from one APM to another APM due to temporary differences in output voltages of APMs 310A-310N. As discussed above with reference to FIG. 2, each of APMs 310A-310N has a build-in mechanism to prevent transient cross-current. Specifically, each APM has a local comparator to compare the APM output voltage against one of V1 and V2, and at least one diode in each switch path within the APM, which can be activated by an output signal of the local comparator to block the flow of cross-current from APM output to one of the voltage supply rails. With such build-in mechanism to prevent transient cross-current within each of APMs 310A-310N, more flexibility is allowed in the sequence and timing of voltage switching. Furthermore, locations or placement of APMs 310A-310N is no longer restricted due to concern of cross-current.

Figure 4:
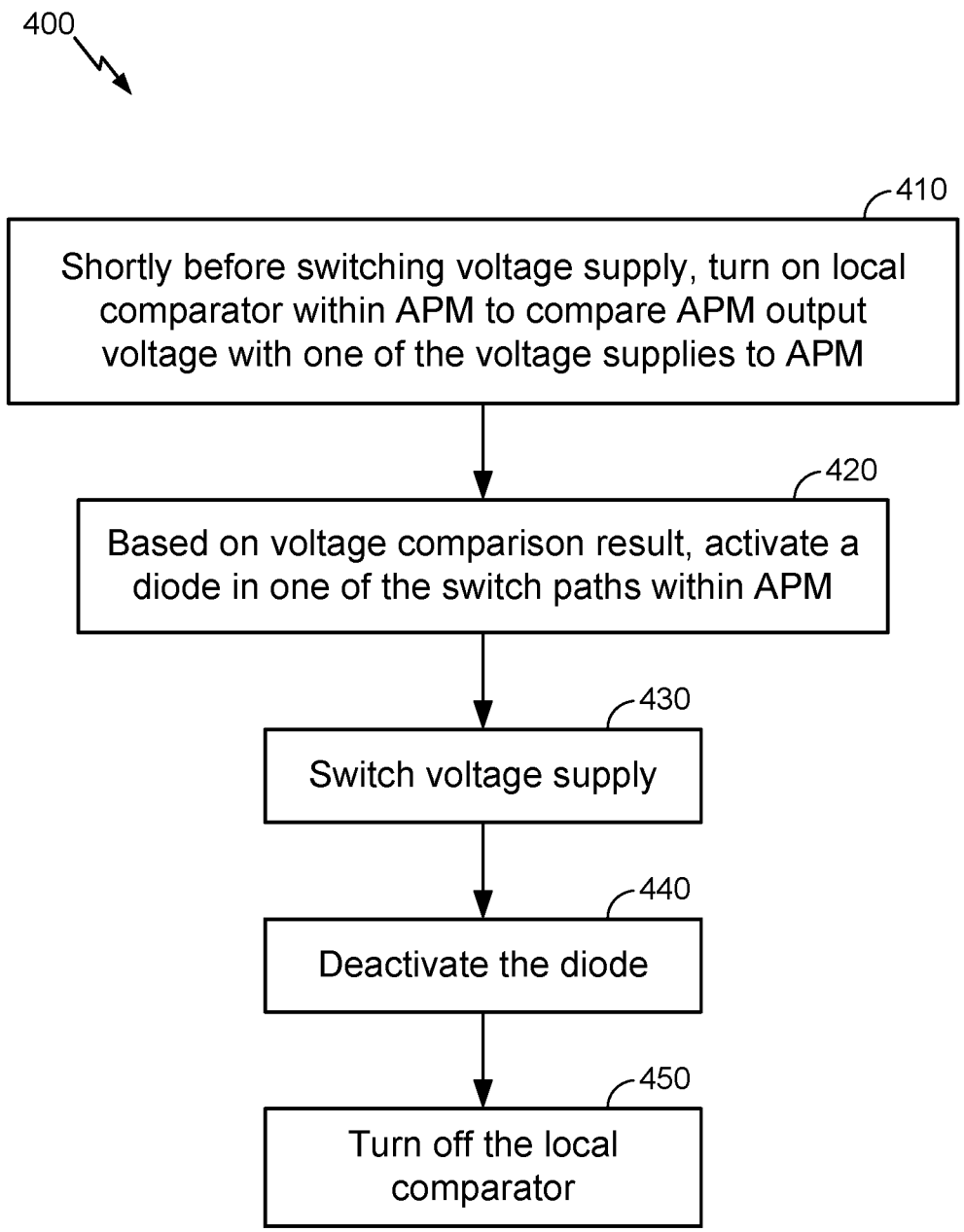
FIG. 4 shows one implementation of a method 300 to prevent or minimize cross-current in an adaptive power multiplexer (APM).

FIG. 4 shows one implementation of a method 400 to prevent or minimize cross-current in an adaptive power multiplexer (APM). The method 400 may be implemented using hardware, such as the circuitries and modules shown in FIG. 2.

The method 400 begins at block 410. Shortly before switching voltage supply in an APM (such as APM 210 in FIG. 2), a local comparator (e.g., local comparator 215 in FIG. 2) within the APM is turned on to compare APM output voltage with one of the voltage supplies to the APM. For example, the APM can receive two or more voltage supplies, each of which is provided to a distinct switch path within the APM to be routed to an output of the APM. The APM is further configured to select one of the voltage supplies received to output to another module or circuit. The local comparator within the APM is configured to compare the output voltage of the APM against one of the voltage supplies in response to control signals from an external control module (e.g., control module 230 in FIG. 2). In some implementations, the APM further includes local control circuitries to turn on the local comparator, to control timing of the local comparator operations, and/or to configure the local comparator to select one of the voltage supplies to compare against the output voltage of the APM.

From block 410, the method 400 transitions to block 420, where a diode in one of the switch paths within the APM is activated, turned on, or enabled based on the voltage comparison result from the local comparator. For example, referring to FIG. 2, diode 216 may be activated if local comparator 215 determines that vdd_apm1 is higher than vdd_aux and switch 212 is closed or about to be closed. By activating diode 216, potential cross-current flowing from output 219 of APM 210 can be blocked from the voltage supply rail of vdd_aux.

From block 420, the method 400 transitions to block 430, where the APM switches voltage supply. For example, the APM can switch voltage supply by closing one or more switches in the switch path associated with the voltage supply to be selected and opening one or more switches in another switch path associated with the voltage supply to be de-selected.

From block 430, the method 400 transitions to block 440, where the diode is deactivated. From block 440, the method 400 transitions to block 450, where the local comparator is turned off. After voltage switching is completed across all, or at least most, of the APMs in the SOC, the risk of transient cross-current is gone, and thus, there is no need to continue activating the diode. As such, the diode can be deactivated at this stage. Likewise, the local comparator is no longer needed after voltage switching has completed. Thus, the local comparator can be turned off to save power.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An adaptive power multiplexer (APM), comprising:
   a first switch path coupled between a first voltage supply rail and a voltage output terminal, the first switch path including a first switch;
   a second switch path coupled between a second voltage supply rail and the voltage output terminal, the second switch path including a second switch, wherein the first switch and the second switch are configured to select one of a first voltage supply from the first voltage supply rail and a second voltage supply from the second voltage supply rail as an output voltage supply to be output at the voltage output terminal; and
   a comparator coupled to the first voltage supply rail, the second voltage supply rail, and the voltage output terminal, wherein the comparator is configured to compare the output voltage supply with one of the first voltage supply and the second voltage supply and to output a control signal.

2. The APM of claim 1, wherein the first switch path further comprises a first diode coupled between the first switch and the voltage output terminal; and the second switch path further comprises a second diode coupled between the second switch and the voltage output terminal.

3. The APM of claim 2, wherein an output of the comparator is coupled to the first diode and the second diode such that one of the first diode and the second diode is activated in response to the control signal from the comparator.

4. The APM of claim 3, wherein the first diode is configured to block cross-current flowing from the voltage output terminal to the first voltage supply rail when the first diode is activated, and wherein the second diode is configured to block cross-current flowing from the voltage output terminal to the second voltage supply rail when the second diode is activated.

5. The APM of claim 2, wherein the first diode includes a first positive terminal and a first negative terminal, the first positive terminal is directly coupled to the first switch, and the first negative terminal is directly coupled to the voltage output terminal.

6. The APM of claim 5, wherein the second diode includes a second positive terminal and a second negative terminal, the second positive terminal is directly coupled to the second switch, and the second negative terminal is directly coupled to the voltage output terminal.

7. The APM of claim 2, wherein the first diode is a first diode-connected field effect transistor (FET) and the second diode is a second diode-connected FET.

8. A system on a chip (SoC), comprising:
a plurality of adaptive power multiplexers (APM's), each of the plurality of APM's comprising:
a first switch path coupled between a first voltage supply rail and a voltage output terminal, the first switch path including a first switch;
a second switch path coupled between a second voltage supply rail and the voltage output terminal, the second switch path including a second switch, wherein the first switch and the second switch are configured to select one of a first voltage supply from the first voltage supply rail and a second voltage supply from the second voltage supply rail as an output voltage supply to be output at the voltage output terminal; and
a comparator coupled to the first voltage supply rail, the second voltage supply rail, and the voltage output terminal, wherein the comparator is configured to compare the output voltage supply with one of the first voltage supply and the second voltage supply and to output a control signal.

9. The SoC of claim 8, wherein the first switch path further comprises a first diode coupled between the first switch and the voltage output terminal; and the second switch path further comprises a second diode coupled between the second switch and the voltage output terminal.

10. The SoC of claim 9, wherein an output of the comparator is coupled to the first diode and the second diode such that one of the first diode and the second diode is activated in response to the control signal from the comparator.

11. The SoC of claim 10, wherein the first diode is configured to block cross-current flowing from the voltage output terminal to the first voltage supply rail when the first diode is activated, and wherein the second diode is configured to block cross-current flowing from the voltage output terminal to the second voltage supply rail when the second diode is activated.

12. The SoC of claim 9, wherein the first diode includes a first positive terminal and a first negative terminal, the first positive terminal is directly coupled to the first switch, and the first negative terminal is directly coupled to the voltage output terminal.

13. The SoC of claim 12, wherein the second diode includes a second positive terminal and a second negative terminal, the second positive terminal is directly coupled to the second switch, and the second negative terminal is directly coupled to the voltage output terminal.

14. The SoC of claim 9, wherein the first diode is a first diode-connected field effect transistor (FET) and the second diode is a second diode-connected FET.

15. The SoC of claim 8, wherein the plurality of APM's are daisy-chained and are configured to switch voltage sequentially.

16. The SoC of claim 8, further comprising a plurality of circuit modules, each of the plurality of circuit modules coupled to one of the plurality of APM's to receive the output voltage supply from the one of the plurality of APM's.

17. A method to reduce cross-current in an adaptive power multiplexer (APM), comprising:
before switching from a first voltage supply provided by a first voltage supply rail to a second voltage supply provided by a second voltage supply rail, turning on a local comparator within the APM to perform a comparison on an output voltage of the APM with one of the first and the second voltage supplies;
based on result of the comparison, activating one of a first and a second diodes within the APM;
switching from the first voltage supply to the second voltage supply; and
deactivating the one of the first and the second diodes within the APM.

18. The method of claim 17, further comprising turning off the local comparator within the APM after switching from the first voltage supply to the second voltage supply.

19. The method of claim 17, wherein the one of the first and the second diodes within the APM, when activated, is configured to block cross-current flowing from an output of the APM to the first or the second voltage supply rail.

* * * * *